(12) United States Patent
Yang

(10) Patent No.: US 11,055,406 B2
(45) Date of Patent: Jul. 6, 2021

(54) APPLICATION SECURITY PROTECTION METHOD, TERMINAL, AND STORAGE MEDIUM

(71) Applicant: TENCENT TECHNOLOGY (SHENZHEN) COMPANY LIMITED, Guangdong (CN)

(72) Inventor: Xueying Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 15/438,251

(22) Filed: Feb. 21, 2017

(65) Prior Publication Data
US 2017/0161500 A1 Jun. 8, 2017

Related U.S. Application Data

(63) Continuation of application No. PCT/CN2016/077431, filed on Mar. 25, 2016.

(30) Foreign Application Priority Data

Apr. 23, 2015 (CN) .......................... 201510197322.4

(51) Int. Cl.
G06F 21/56 (2013.01)
G06F 3/0484 (2013.01)
G06F 3/0481 (2013.01)

(52) U.S. Cl.
CPC ........ *G06F 21/566* (2013.01); *G06F 3/04842* (2013.01); *G06F 3/0481* (2013.01); *G06F 2221/033* (2013.01)

(58) Field of Classification Search
CPC .. G06F 21/566; G06F 3/04842; G06F 3/0481; G06F 2221/033
See application file for complete search history.

(56) References Cited

U.S. PATENT DOCUMENTS

2006/0150256 A1* 7/2006 Fanton .................... G06F 21/10
726/27
2007/0079377 A1* 4/2007 Pagan ................... G06F 21/562
726/24

(Continued)

FOREIGN PATENT DOCUMENTS

CN 102799812 A 11/2012
CN 103136476 A 6/2013

(Continued)

OTHER PUBLICATIONS

International Search Report in international application No. PCT/CN2016/077431, dated Jul. 5, 2016.

(Continued)

*Primary Examiner* — Kevin Bechtel
*Assistant Examiner* — Forrest L Carey
(74) *Attorney, Agent, or Firm* — Brinks Gilson & Lione

(57) ABSTRACT

Disclosed are an application security protection method, a terminal, and a storage medium. The method includes the steps of: monitoring whether an application software protection triggering condition is satisfied (S301); if yes, judging whether current application software is malicious software (S302); if yes, providing prompt information indicating that the current application software is malicious software (S303); and when an opening continuing instruction for continuing to open the current application software is received (S304), starting the current application software (S305). The application security protection method, the terminal and the storage medium greatly improve the security when an application program runs at the terminal.

12 Claims, 11 Drawing Sheets

(56) References Cited

U.S. PATENT DOCUMENTS

| | | | | |
|---|---|---|---|---|
| 2007/0240217 | A1* | 10/2007 | Tuvell | G06F 21/56 726/24 |
| 2009/0100520 | A1* | 4/2009 | Reasor | G06F 21/566 726/23 |
| 2009/0165131 | A1* | 6/2009 | Treadwell | G06F 21/52 726/22 |
| 2009/0241191 | A1 | 9/2009 | Keromytis | |
| 2010/0332996 | A1* | 12/2010 | Sarkaria | G06F 8/60 715/748 |
| 2013/0198872 | A1* | 8/2013 | Liu | G06F 21/60 726/30 |
| 2013/0276056 | A1* | 10/2013 | Epstein | G06F 21/604 726/1 |
| 2013/0318614 | A1* | 11/2013 | Archer | G06F 21/577 726/25 |
| 2014/0337978 | A1 | 11/2014 | Keromytis et al. | |
| 2016/0191476 | A1* | 6/2016 | Schutz | H04L 9/0891 713/165 |

FOREIGN PATENT DOCUMENTS

| | | |
|---|---|---|
| CN | 103218564 A | 7/2013 |
| CN | 104050417 A | 9/2014 |

OTHER PUBLICATIONS

Office Action dated Sep. 25, 2019 for Chinese Application No. 201510197322.4 with concise English Translation, 9 pages.

Office Action dated Feb. 11, 2019 for Chinese Application No. 201510197322.4 with concise English Translation, 8 pages.

Office Action dated Jun. 28, 2019 for Chinese Application No. 201510197322.4 with concise English Translation, 8 pages.

* cited by examiner

APPLICATION SECURITY PROTECTION METHOD, TERMINAL, AND STORAGE MEDIUM

CROSS REFERENCE TO RELATED APPLICATIONS

This is a continuation application of International Patent Application No. PCT/CN2016/077431, filed on Mar. 25, 2016, which claims priority to Chinese Patent Application No. 201510197322.4 filed on Apr. 23, 2015, the disclosure of which is incorporated by reference herein in its entirety.

TECHNICAL FIELD

The disclosure relates to the field of application security, and in particular to an application security protection method, a terminal, and a storage medium.

BACKGROUND

At present, with the popularization of smart phones, tablet personal computers and other terminals, more and more application programs developed for applications of the terminals emerge, and the sources of application programs installed on the terminals are also increasingly extensive, so that security risks during installation of the application programs on the terminals, such as viruses, malicious propagation, system destruction and frauds, gradually increase. As for security protection of the application programs, such as, game software, on the terminals, it is implemented by periodically scanning by antivirus software. If the game software is scanned to be determined as malicious software, a user is prompted, thus achieving the aim of security protection. However, if the user omits or misses a virus reminder for the antivirus software, the user may probably suffer a loss when opening the game software, thereby incurring great security risks.

SUMMARY

An application security protection method includes the steps of:
monitoring whether application software protection triggering condition is satisfied;
if yes, judging whether current application software is malicious software;
if yes, providing prompt information indicating that the current application software is malicious software; and
when an opening continuing instruction for continuing to open the current application software is received, staring the current application software.

A terminal includes a processor and a memory having stored thereon instructions. When the instructions are executed by the processor, the processor is caused to execute the steps of:
monitoring whether application software protection triggering condition is satisfied;
when it is monitored that the application software protection triggering condition is satisfied, judging whether current application software is malicious software;
when it is determined that the current application software is malicious software, providing prompt information indicating that the current application software is malicious software; and
when an opening continuing instruction for continuing to open the current application software is received, starting the current application software.

BRIEF DESCRIPTION OF THE DRAWINGS

In order to more clearly elaborate the technical solutions in the embodiments of the disclosure or the conventional art, drawings to be used in the description of the embodiments or the conventional art will be simply discussed. Apparently, the drawings described below are only some embodiments of the disclosure. Without involving any inventive effort, those skilled in the art may also obtain other drawings according to these drawings.

DETAILED DESCRIPTION

In order to make the objectives, technical solutions and advantages of the disclosure clearer, the disclosure will be further elaborated below in conjunction with the drawings and the embodiments. It will be appreciated that detailed descriptions herein are only intended to explain the disclosure without making limits to the protective scope of the disclosure.

Figure 1:
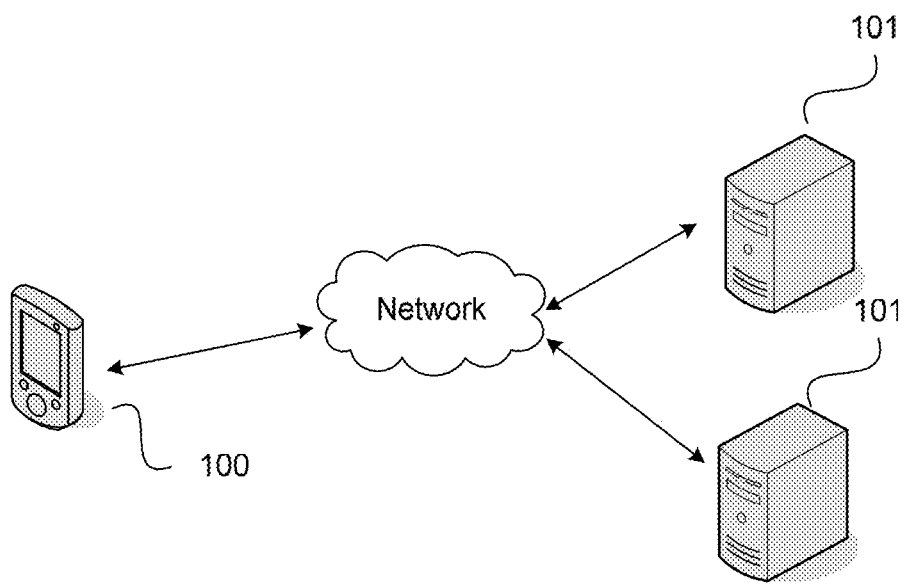
FIG. 1 is a schematic diagram illustrating a working environment of the solution of the disclosure according to an embodiment.

FIG. 1 shows a schematic diagram of a working environment in an embodiment of the disclosure. A smart terminal 100 is connected to a server 101 via a network. The smart terminal 100 interacts with the server 101 via the network. An application program is obtained from the server 101. Then, the obtained application program is installed and applied on the smart terminal 100. However, the application program obtained, by the smart terminal 100, from the server 101 may bring security risks such as malicious payment, privacy stealing, remote control, malicious propagation, charge consumption, system destruction, frauds and rogueries, thereby affecting the application security of the smart terminal. The embodiments of the disclosure provide a protection solution for the application program installed on the smart terminal, and particularly provide a protection solution for an application program in a specific application type.

Figure 2:
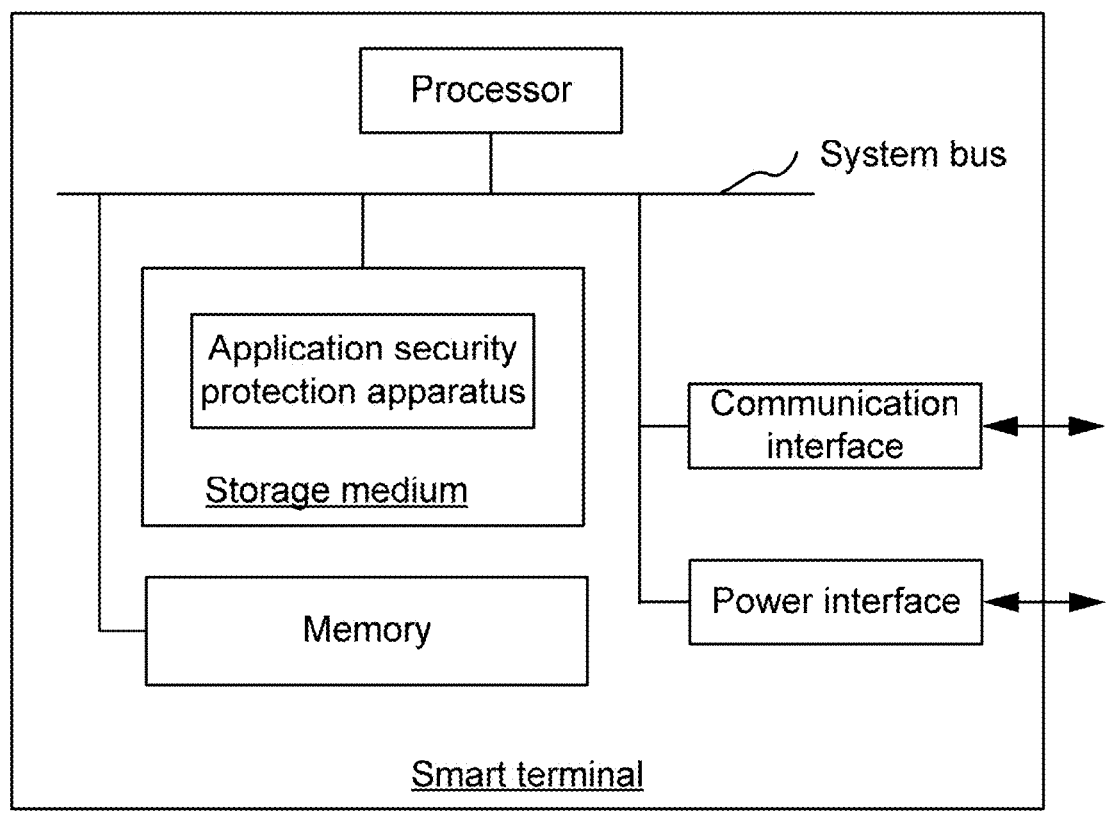
FIG. 2 is a structural schematic diagram illustrating a smart terminal according to an embodiment.

FIG. 2 shows a structural diagram of the smart terminal 100 according to an embodiment. The smart terminal includes a processor, a storage medium, a communication interface, a power interface and a memory, connected via a system bus, wherein the storage medium of the smart terminal 100 stores an application security protection apparatus, configured to protect an application program installed on a smart terminal. The communication interface of the smart terminal 100 is configured to connect and communicate with the server 101. The power interface of the smart terminal 100 is configured to connect with an external power supply. The external power supply supplies power to the smart terminal 100 via the power interface. The smart terminal 100 may be any one device capable of realizing smart input and output, for example, a mobile terminal such as a mobile phone and a tablet personal computer, or may be other devices having the above-mentioned structure such as a personal computer.

In conjunction with schematic diagrams shown in FIG. 1 and FIG. 2, each embodiment of an application security protection method and a terminal is elaborated below.

Figure 3:
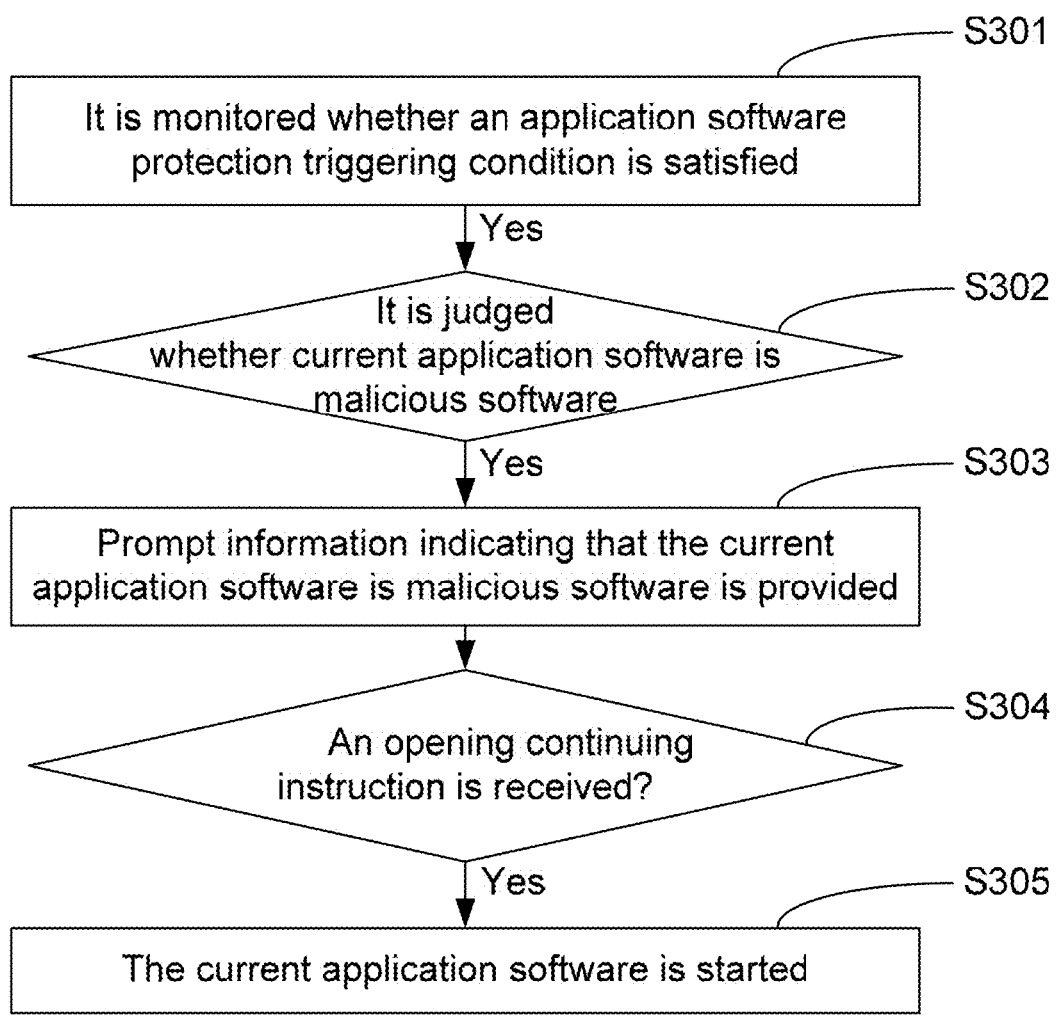
FIG. 3 is a flowchart showing an application security protection method according to an embodiment.

FIG. 3 shows a flowchart of an application security protection method according to an embodiment. As shown in FIG. 3, the method in this embodiment includes the steps as follows.

Step S301: It is monitored whether an application software protection triggering condition is satisfied, and if so, Step S302 is executed.

Step S302: It is judged whether current application software is malicious software, and if so, Step S303 is executed.

Step S303: Prompt information indicating that the current application software is malicious software is provided.

Step S304: It is judged whether an opening continuing instruction for continuing to open the current application software is received, and if so, Step S305 is executed.

Step S305: The current application software is started.

Herein, after the prompt information is provided in Step S303, the current application software may be not opened in view of actual factors, and therefore an opening cancellation instruction will be received probably. After the opening cancellation instruction is received, start of the current application software may be stopped.

After start of the current application software is stopped, prompt information indicating whether to uninstall the current application software may be further provided. When a software uninstalling instruction is received, the current application software is uninstalled according to the software uninstalling instruction. Thus, security risks brought to the smart terminal by the current application software may be avoided fundamentally.

The application protection triggering condition may be set differently on the basis of actual application requirements. In one of specific examples, it is judged whether the application protection triggering condition is satisfied by monitoring recently-opened application software of the terminal. In another specific example, it may be judged whether the application protection triggering condition is satisfied by judging whether the application software opening instruction is received.

Figure 4:
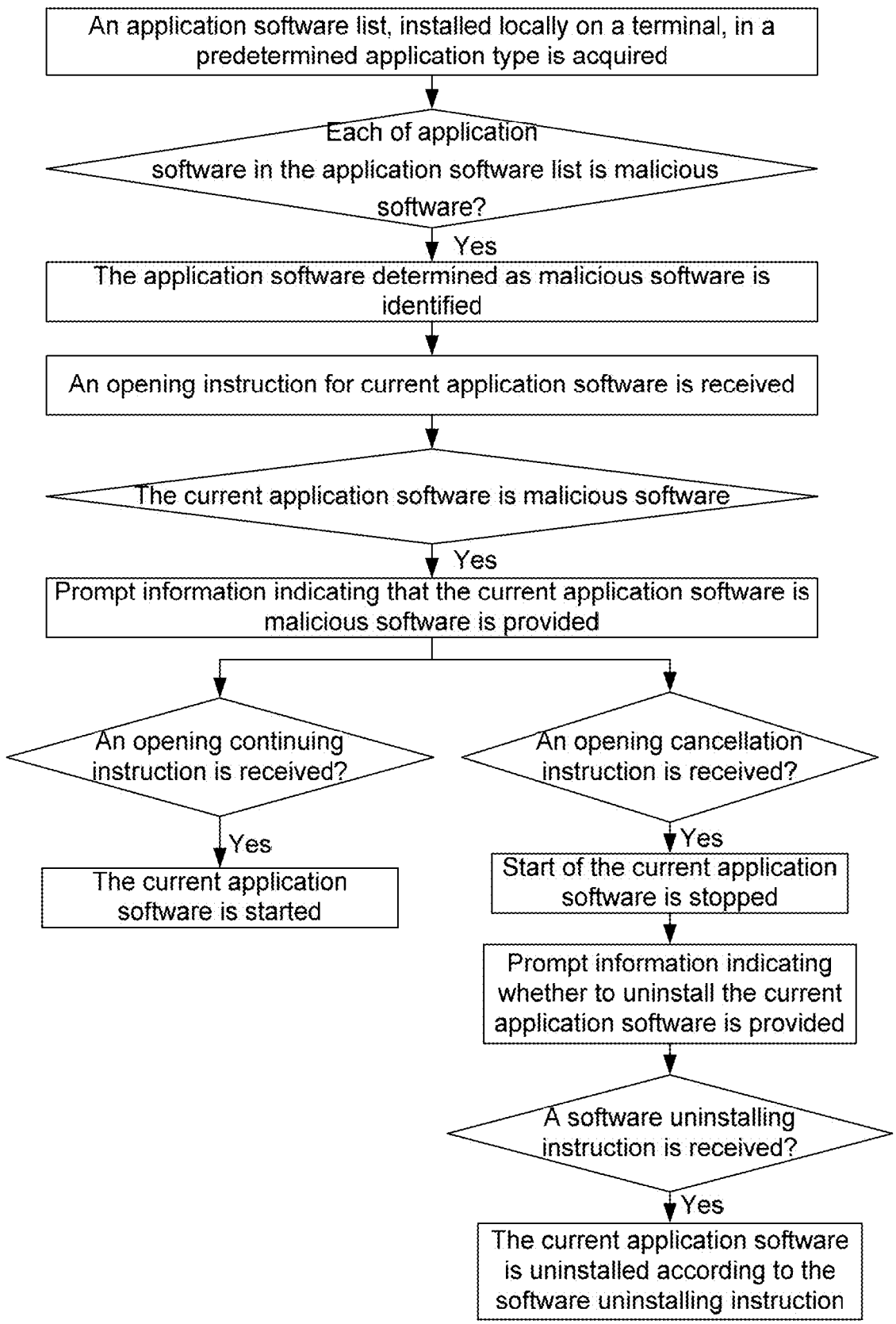
FIG. 4 is a flowchart showing an application security protection method according to another specific example.

As an example, when it is judged whether the application protection triggering condition is satisfied by judging whether the application software opening instruction is received, FIG. 4 shows a flowchart of an application security protection method according to this specific example. In the specific example, an application software list in a predetermined application type is firstly acquired so as to open corresponding application software.

As shown in FIG. 4, in this example, an application software list of application software, installed locally, in a predetermined application type is acquired firstly, it is judged whether each of application software in the application software list is malicious software, and the application software determined as malicious software is identified.

Thereafter, an opening instruction for certain current application software is received, the current application software being one in the application software list, and it is judged whether the current application software is malicious software.

If the current application software is not malicious software, the current application software may be directly opened.

If the current application software is malicious software, prompt information indicating that the current application software is malicious software is provided, thereby performing secondary reminder. Based on the prompt information, a user of the smart terminal may choose to continue opening the current application software, or may select to cancel opening of the current application software.

If the user of the smart terminal continues to open the current application software, an opening continuing instruction for continuing to open the current application software will be received, and after the opening continuing instruction is received, the current application software is started.

If the user of the smart terminal cancels opening of the current application software, an opening cancellation instruction will be received, and after the opening cancellation instruction is received, start of the current application software is stopped. Moreover, prompt information indicating that whether to uninstall the current application software may be provided, and after an uninstalling instruction is received, the current application software is uninstalled.

Figure 5:
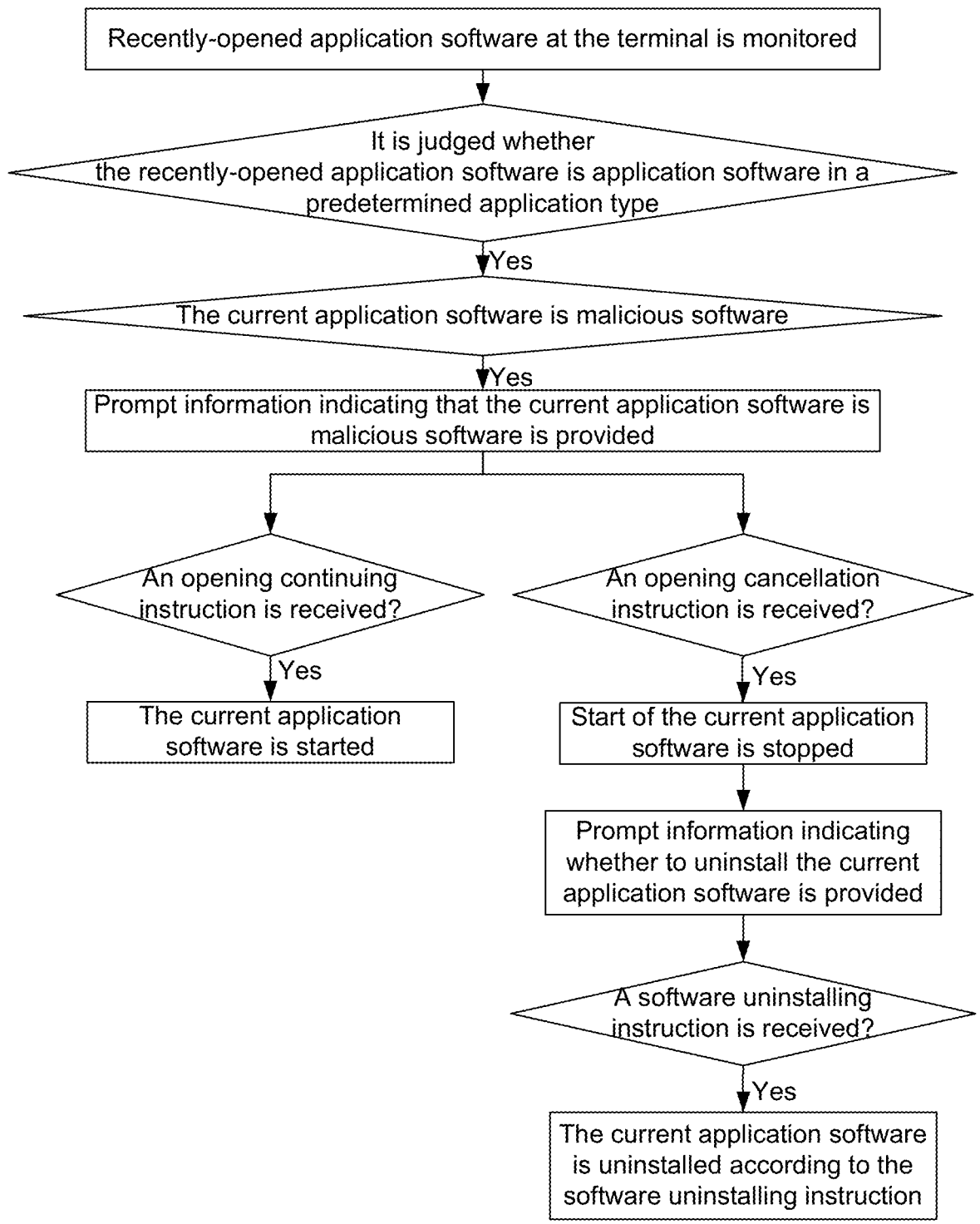
FIG. 5 is a flowchart showing an application security protection method according to another specific example.

As an example, when it is judged whether the application protection triggering condition is satisfied by monitoring the recently-opened application software of the terminal, FIG. 5 shows a flowchart of an application security protection method according to the specific example.

As shown in FIG. 5, the method in this example includes the process as follows.

Firstly, recently-opened application software of a smart terminal is monitored, a specific structure will be provided on the smart terminal to store information about the recently-opened application software. By means of a smart terminal having an Android system, a specific stack is provided to store information about a recently-opened application. For example, if the smart terminal sequentially opens three pieces of application software A, B and C, the stack will include information regarding C, B and A, where information regarding C is stored at the top of the stack. That is, information about a currently-opened application program is stored at the top of the stack. Therefore, the information about the recently-opened application software may be obtained from the top of the stack.

Then, it is judged whether the current application software opened recently is application software in a predetermined application type. For example, it is judged whether the current application software is game software. A specific judgement method may involve comparing the obtained information about the current application software with a game software library, and if the comparison indicates consistency, determining it as game software.

If the current application software is application software in a predetermined application type, it is further judged whether the current application software is malicious software. If the current application software is not malicious software, the current application software may be directly opened.

If the current application software is malicious software, prompt information indicating that the current application software is malicious software is provided, thereby performing secondary reminder. Based on the prompt information, a user of the smart terminal may choose to continue opening the current application software, or may select to cancel opening of the current application software.

If the user of the smart terminal continues to open the current application software, an opening continuing instruction for continuing to open the current application software will be received, and after the opening continuing instruction is received, the current application software is started.

If the user of the smart terminal cancels opening of the current application software, an opening cancellation instruction will be received, and after the opening cancellation instruction is received, start of the current application software is stopped. Moreover, prompt information indicating that whether to uninstall the current application software may be provided, and after an uninstalling instruction is received, the current application software is uninstalled.

Figure 6:
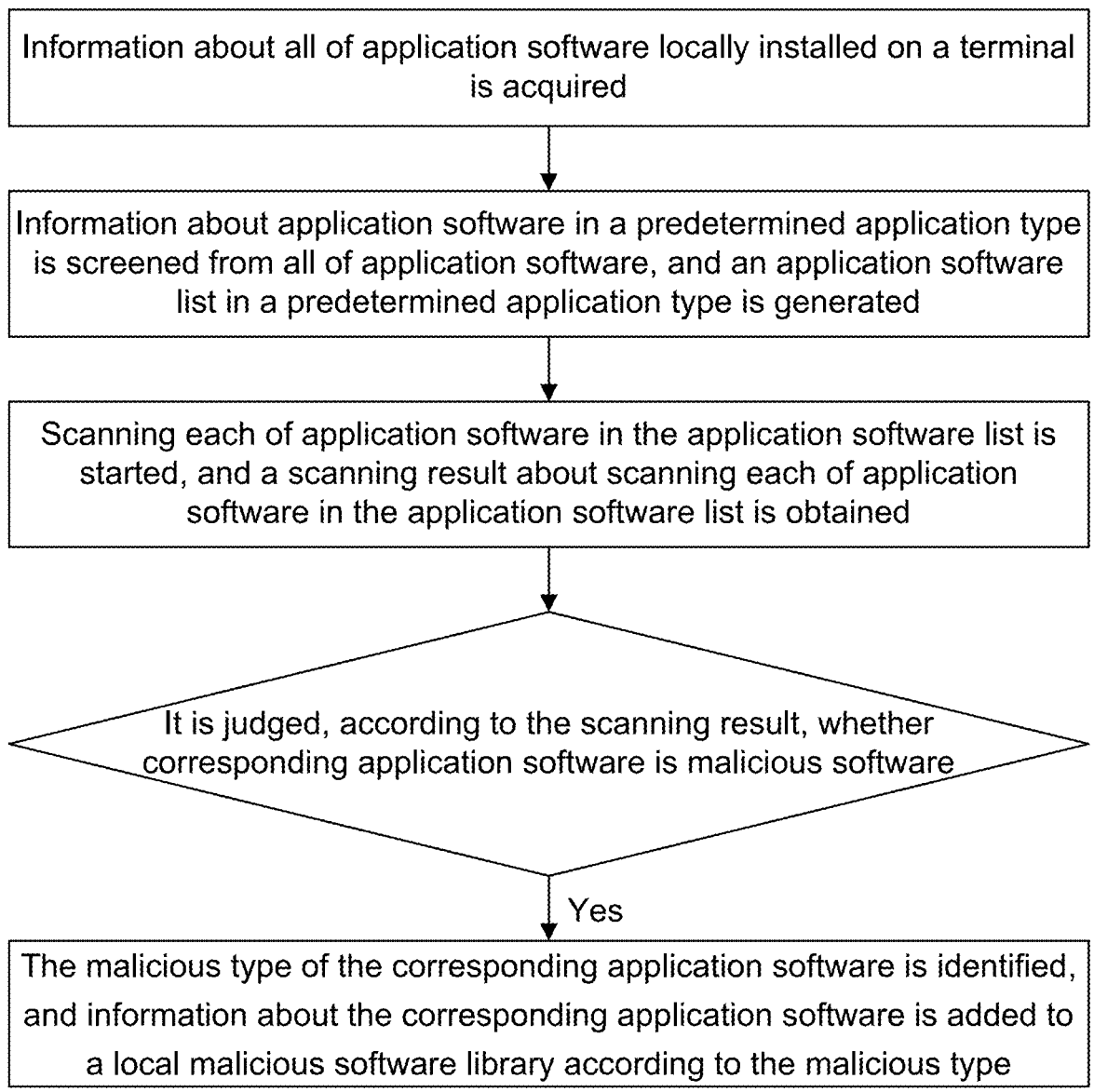
FIG. 6 is a flowchart showing generation of an application security list according to a specific example.

FIG. 6 shows a flowchart of generation of an application security list according to a specific example. As shown in FIG. 6, the application security list may be generated according to the following steps:

firstly, acquiring information about all of application software locally installed on a smart terminal; and then, screening application software in a predetermined application type from all of application software, and generating an application software list in a predetermined application type, wherein the application software list includes information about each of screened application software in the predetermined application type.

Herein, the step of screening the application software in the predetermined application type from all of application software may be executed in the modes as follows.

One of the modes may be: comparing each of application software with a software database, locally installed on the smart terminal, in a predetermined application type, if the comparison indicates consistency, determining that the application software is the application software in the predetermined application type, and if the comparison indicates inconsistency, determining that the application software is not the application software in the predetermined application type.

Besides, the obtained information about each of application software may be transmitted to a cloud server, and the cloud server compares the information about each of application software with a cloud database, then screens the information about the application software in the predetermined application type on the basis of the comparison, and returns the screened information to the smart terminal.

If necessary, a local comparison mode on the smart terminal and a comparison mode on the cloud server may be executed at the same time. The smart terminal generates the application software list in the predetermined application type on the basis of a local comparison result from the smart terminal and a comparison result from the cloud server. The application software list may include the information about the screened application software in the predetermined application type.

As shown in FIG. 6, after the application software list is obtained, scanning each of application software in the application software list may be further started, and a scanning result of each of application software in the application software list is obtained.

Scanning each of application software may be performed by directly calling local virus scanning software. Alternatively, the information about each of application software may be sent to the cloud server and scanned by the cloud server to obtain a scanning result.

Based on the local virus scanning software of the smart terminal or the scanning result from the cloud server, it may be judged whether the corresponding application software is malicious software. If it is malicious software, the malicious type of the malicious software is identified according to the scanning result, and the information about the corresponding application software is added to a local malicious software library of the smart terminal on the basis of the malicious type.

Thus, in the embodiments with reference to FIG. 4 and FIG. 5, when it is judged whether current application software is malicious software, information about the current application software may be directly compared with the local malicious software library of the smart terminal. If a comparison result indicates inconsistency, it may be determined that the current application software is not malicious software. If the comparison result indicates consistency, it may be directly determined that the current application software is malicious software, and the malicious type of the malicious software may be determined to prompt the user of the smart terminal.

Figure 7:
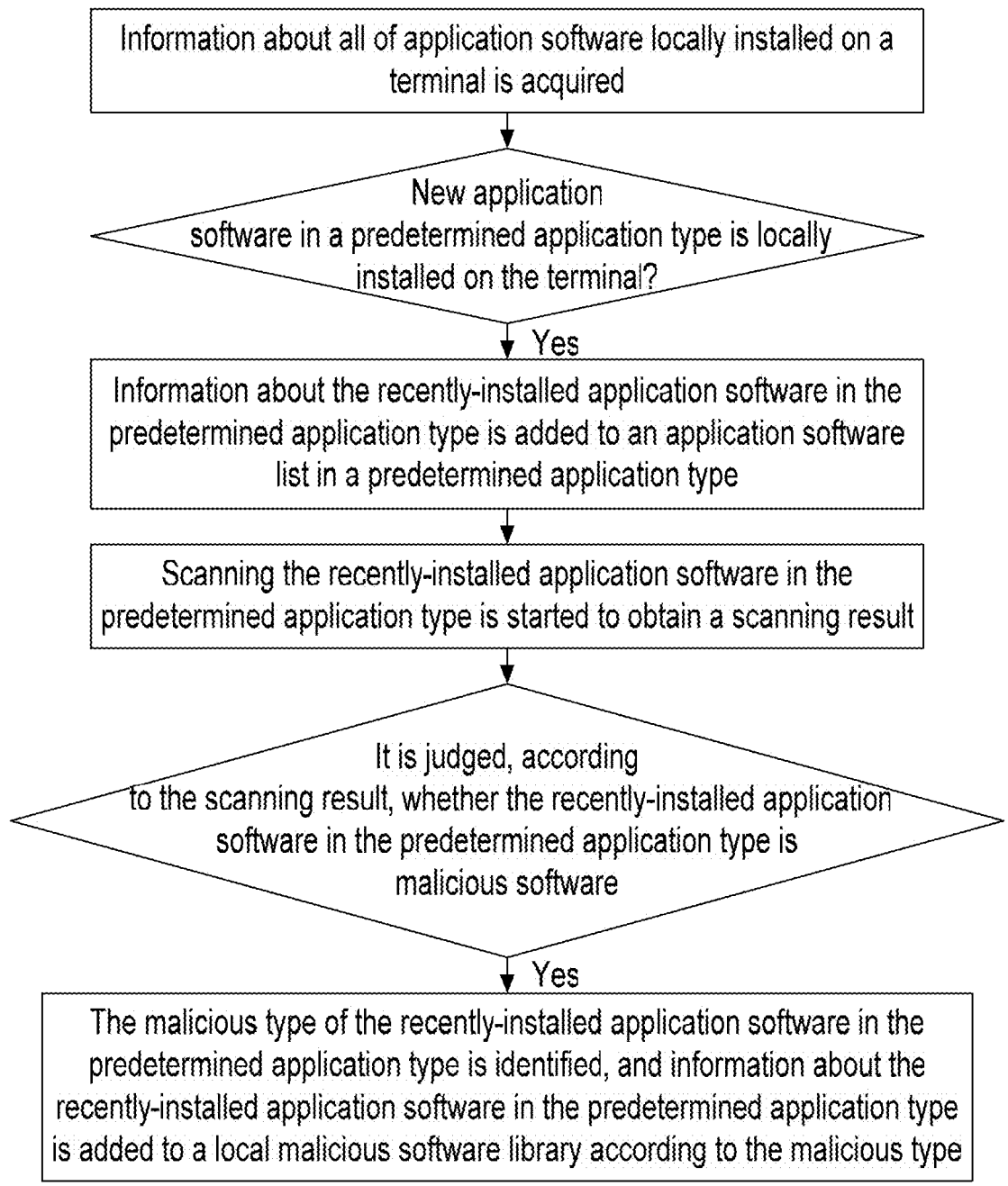
FIG. 7 is a flowchart showing a process of scanning recently-installed application software according to a specific example.

In use of the smart terminal, the smart terminal will probably continuously install new different application software, and therefore it is necessary to safely protect with respect to recently-installed application software. FIG. 7 shows a flowchart of a process of scanning recently-installed application software according to a specific example.

As shown in FIG. 7, a specific process is as follows.

Information about all of application software locally installed on a smart terminal is acquired, and it is judged whether new application software in a predetermined application type is locally installed on the smart terminal. A mode of judging whether the application software is the application software in the predetermined application type may be the same as the mode in the example corresponding to FIG. 6.

If the application software in the predetermined application type is recently installed, information about the recently-installed application software in the predetermined application type is added to an application software list in a predetermined application type, and scanning the recently-installed application software in the predetermined application type is started to obtain a scanning result. A specific scanning mode may be the same as the mode in the example corresponding to FIG. 6.

Thereafter, it is judged, based on the scanning result, whether the recently-installed application software in the predetermined application type is malicious software. If it is malicious software, the malicious type of the malicious software is identified based on the scanning result, such as malicious payment, privacy stealing, remote control, malicious propagation, charge consumption, system destruction, frauds and rogueries, and information about application software corresponding to the malicious type is added to a local malicious software library of the smart terminal.

On the basis of the application security protection method mentioned above by each embodiment, it will be elaborated below in conjunction with the application security protection method in one of specific examples. In this specific example, it is illustrated with determination of a situation where information about an application software list and malicious software has been stored in a malicious software library.

Figure 8:
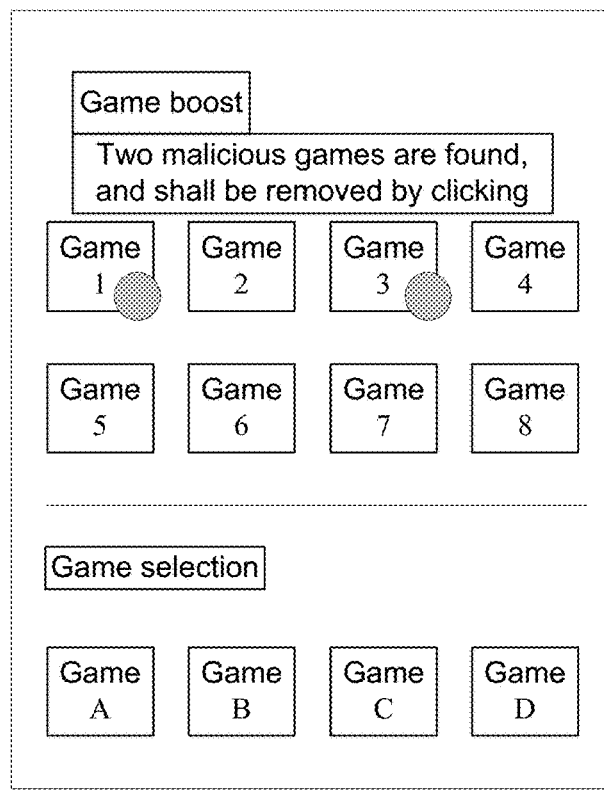
FIG. 8 is a schematic diagram illustrating a terminal interface for identifying malicious software according to a specific example.

Firstly, the established application software list in a predetermined application type is acquired, it is judged, according to a malicious software library, whether each of application software in the application software list is malicious software, and the application software determined as the malicious software is identified. A specific identification mode may be any possible mode such as corner marks, different colours and highlighting. When the application software is identified with the corner marks, a specific schematic diagram of a terminal interface may be shown in FIG. 8. According to the identification, the user of the smart terminal may be firstly reminded of that the identified application software is the malicious software.

According to the identification, the user of the smart terminal may choose not to continue opening the application software, or may choose to continue opening the application software. If it is to continue opening the application software, after the user of the smart terminal clicks on an icon of the application software shown in FIG. 8, software corresponding to the method of the embodiment of the disclosure will receive an opening instruction for the application software.

Figure 9:
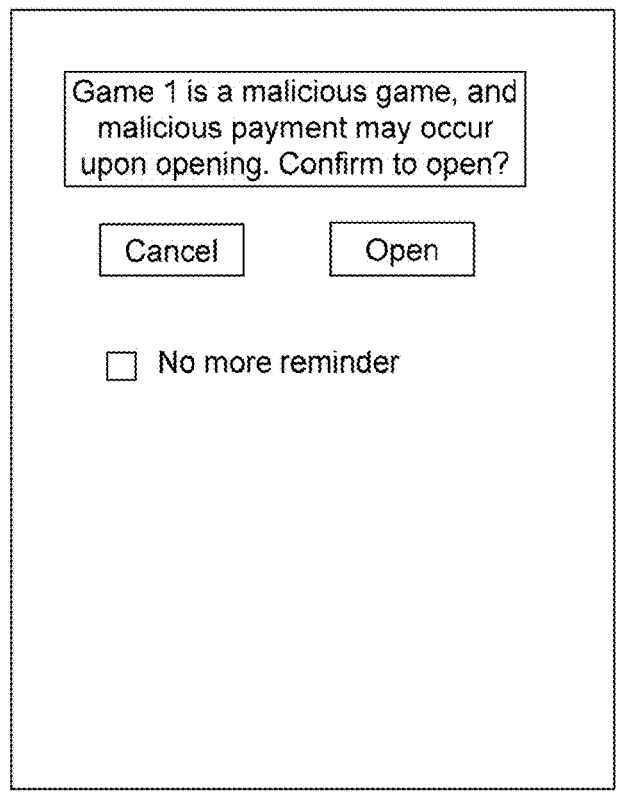
FIG. 9 is a schematic diagram illustrating a terminal interface for secondarily reminding malicious software according to a specific example.

After the opening instruction is received, if current application software is not malicious software, the current application software may be directly opened. If the current application software is malicious software, prompt information indicating that the current application software is malicious software is provided so as to secondarily remind the user of the smart terminal. The prompt information may be provided in any possible mode such as a pop-up box. By taking the pop-up box as an example, FIG. 9 shows a schematic diagram of a terminal interface for secondary reminder in a specific example. As shown in FIG. 9, the pop-up box includes an opening control and a stopping control. According to the prompt information in the pop-up box, the user of the smart terminal may choose to continue opening the current application software, or may choose to cancel opening of the current application software.

If the user of the smart terminal continues opening the current application software, an opening continuing instruction may be input by means of the opening control. After the method of the embodiment of the disclosure receives the opening continuing instruction by means of the opening control, the current application software is started.

If the user of the smart terminal cancels opening of the current application software, an opening cancellation instruction may be input by means of a cancellation control. After the method of the embodiment of the disclosure receives the opening cancellation instruction by means of the cancellation control, start of the current application software is stopped. Moreover, prompt information indicating whether to uninstall the current application software may be provided. The prompt information may be provided by means of a pop-up box. An uninstalling control may be provided in the pop-up box and configured to receive an uninstalling instruction. If the user of the smart terminal chooses to uninstall the software, the uninstalling instruction may be received by means of the uninstalling control, and the current application software is uninstalled based on the uninstalling instruction.

An embodiment of the disclosure also provides a terminal. An interior structure of the terminal may correspond to the structure shown in FIG. 2. All or some of modules below may be achieved by software, hardware or combinations thereof.

Figure 10:
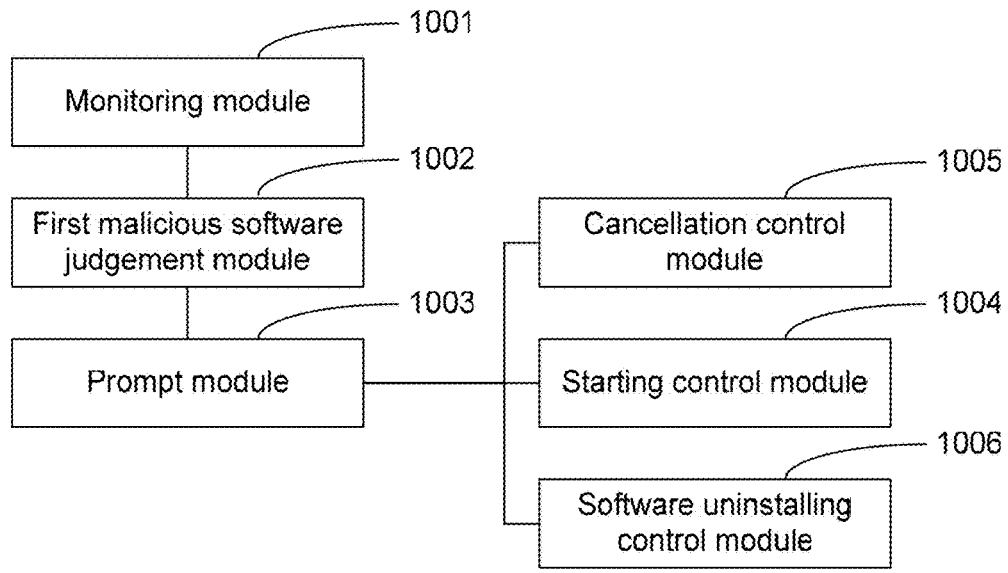
FIG. 10 is a structural diagram illustrating a terminal according to an embodiment.

As shown in FIG. 10, the terminal in this embodiment includes:

a monitoring module 1001, configured to monitor whether an application software protection triggering condition is satisfied;

a first malicious software judgement module 1002, configured to judge whether current application software is malicious software when the monitoring module 1001 monitors that the application software protection triggering condition is satisfied;

a prompt module 1003, configured to provide prompt information indicating that the current application software is malicious software when a judgement result of the first malicious software judgement module 1002 is Yes; and a starting control module 1004, configured to start the current application software when an opening continuing instruction for continuing to open the current application software is received.

Herein, after the prompt module 1003 provides the prompt information, the current application software may not be opened in view of actual factors, and therefore an opening cancellation instruction will be received probably. Hence, as shown in FIG. 10, the terminal in this embodiment may further include:

a cancellation control module 1005, configured to stop start of the current application software upon receipt of the opening cancellation instruction.

Herein, the prompt module 1003 may provide prompt information in various possible modes such as a pop-up box. When the prompt module 1003 displays the prompt information with a pop-up box, an opening control and a stopping control may be provided on the pop-up box. The starting control module 1004 may receive the opening continuing instruction by means of the opening control, and the cancellation control module 1005 receives the opening cancellation instruction by means of the stopping control.

Besides, as shown in FIG. 10, the terminal in this embodiment may further include a software uninstalling control module 1006. After start of the current application software is stopped, prompt information indicating whether to uninstall the current application software may be further provided, and the current application software can be uninstalled. Thus, security risks brought to a smart terminal by the current application software may be avoided fundamentally.

Hence, the prompt module 1003 is further configured to provide prompt information indicating whether the current application software is uninstalled after the cancellation control module 1005 stops start of the current application software. The prompt information may be displayed by means of a pop-up box. An uninstalling control may be provided in the pop-up box.

The software uninstalling control module 1006 is configured to uninstall, when receiving a software uninstalling instruction, the current application software according to the software uninstalling instruction, and the uninstalling instruction may be received by means of an uninstalling control.

The application protection triggering condition may be set differently according to actual application requirements. In one of specific examples, it may be judged whether the application protection triggering condition is satisfied by monitoring recently-opened application software of the terminal. In another specific example, it may be judged whether the application protection triggering condition is satisfied by judging whether the application software opening instruction is received.

Figure 11:
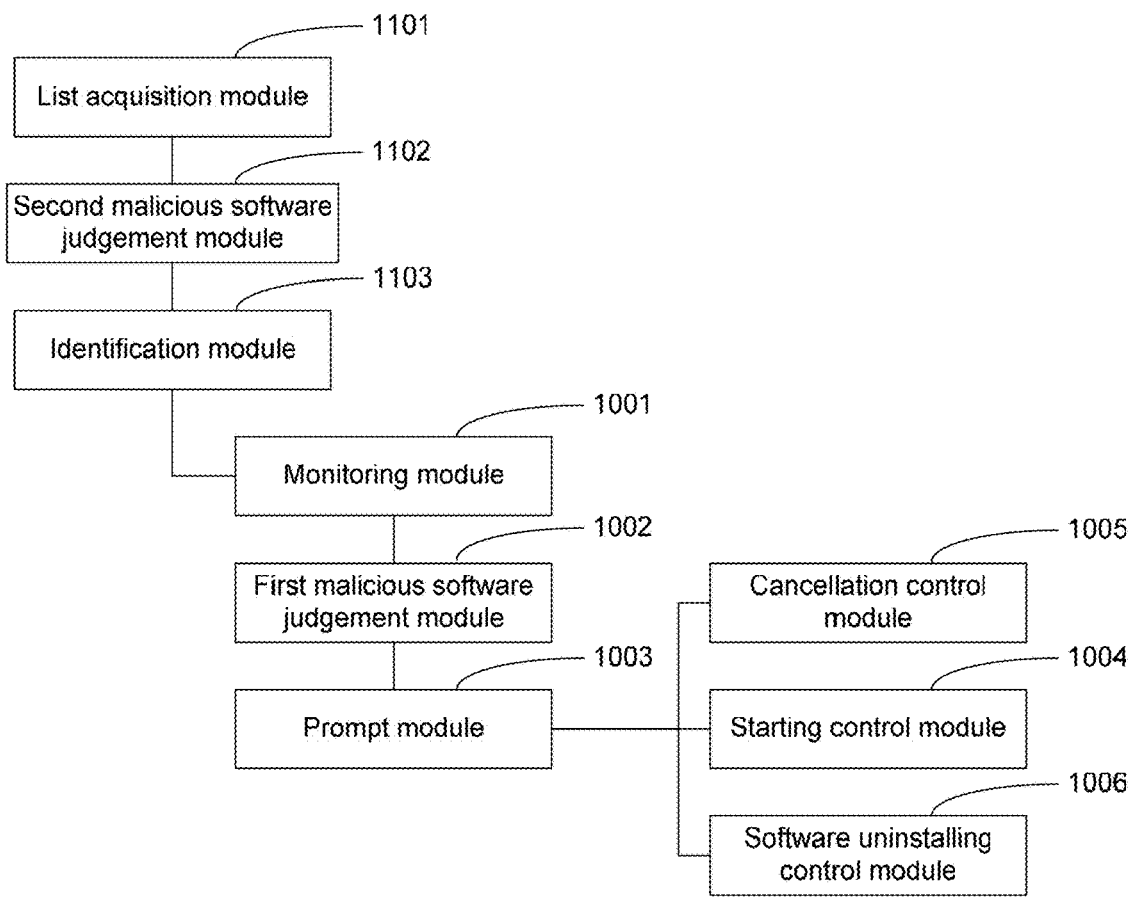
FIG. 11 is a structural diagram illustrating a terminal according to a specific example.

As an example, when it is judged whether the application protection triggering condition is satisfied by judging whether the application software opening instruction is received, FIG. 11 shows a structural diagram of a terminal according to this specific example.

As shown in FIG. 11, on the basis of the terminal corresponding to FIG. 10, the terminal in this embodiment further includes:

a list acquisition module 1101, configured to acquire an application software list of application software, installed locally on the terminal, in a predetermined application type;

a second malicious software judgement module 1102, configured to judge whether each of application software in the application software list is malicious software; and an identification module 1103, configured to identify the application software determined, by the second malicious software judgement module 1102, as malicious software.

In this case, when receiving an opening instruction for the current application software, the monitoring module 1001 determines that the application protection triggering condition is satisfied.

Figure 12:
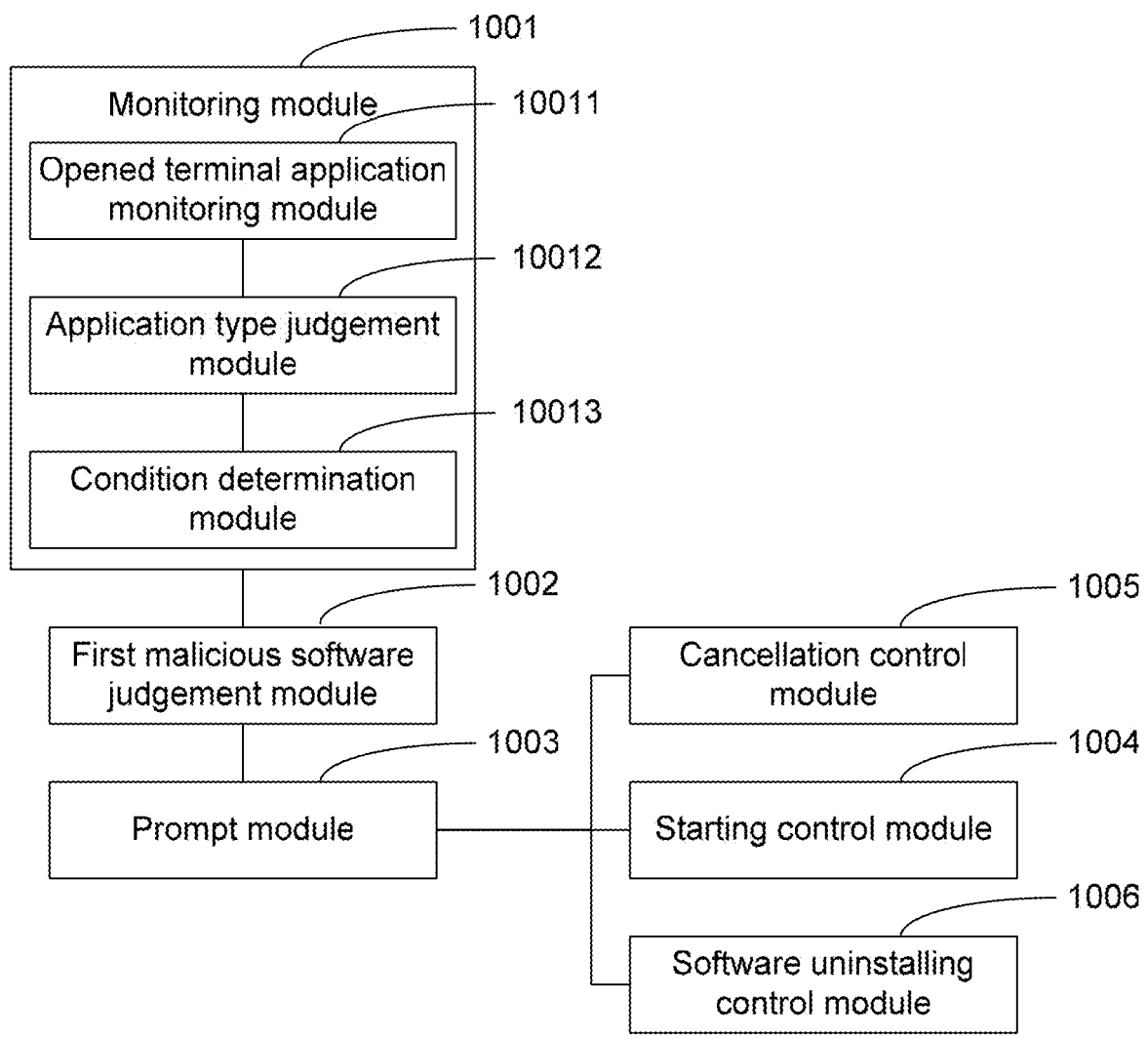
FIG. 12 is a structural diagram illustrating a terminal according to another specific example.

As an example, when it is judged whether the application protection triggering condition is satisfied by monitoring the recently-opened application software of the terminal, FIG. 12 shows a structural diagram of a terminal in another specific example.

As shown in FIG. 12, on the basis of the terminal corresponding to FIG. 10, the monitoring module 1001 includes:

an opened terminal application monitoring module 10011, configured to monitor recently-opened application software of the terminal;

an application type judgement module 10012, configured to judge whether the recently-opened application software is application software in a predetermined application type; and a condition determination module 10013, configured to determine that the application protection triggering condition is satisfied when a judgement result of the application type judgement module 10012 is Yes.

Figure 13:
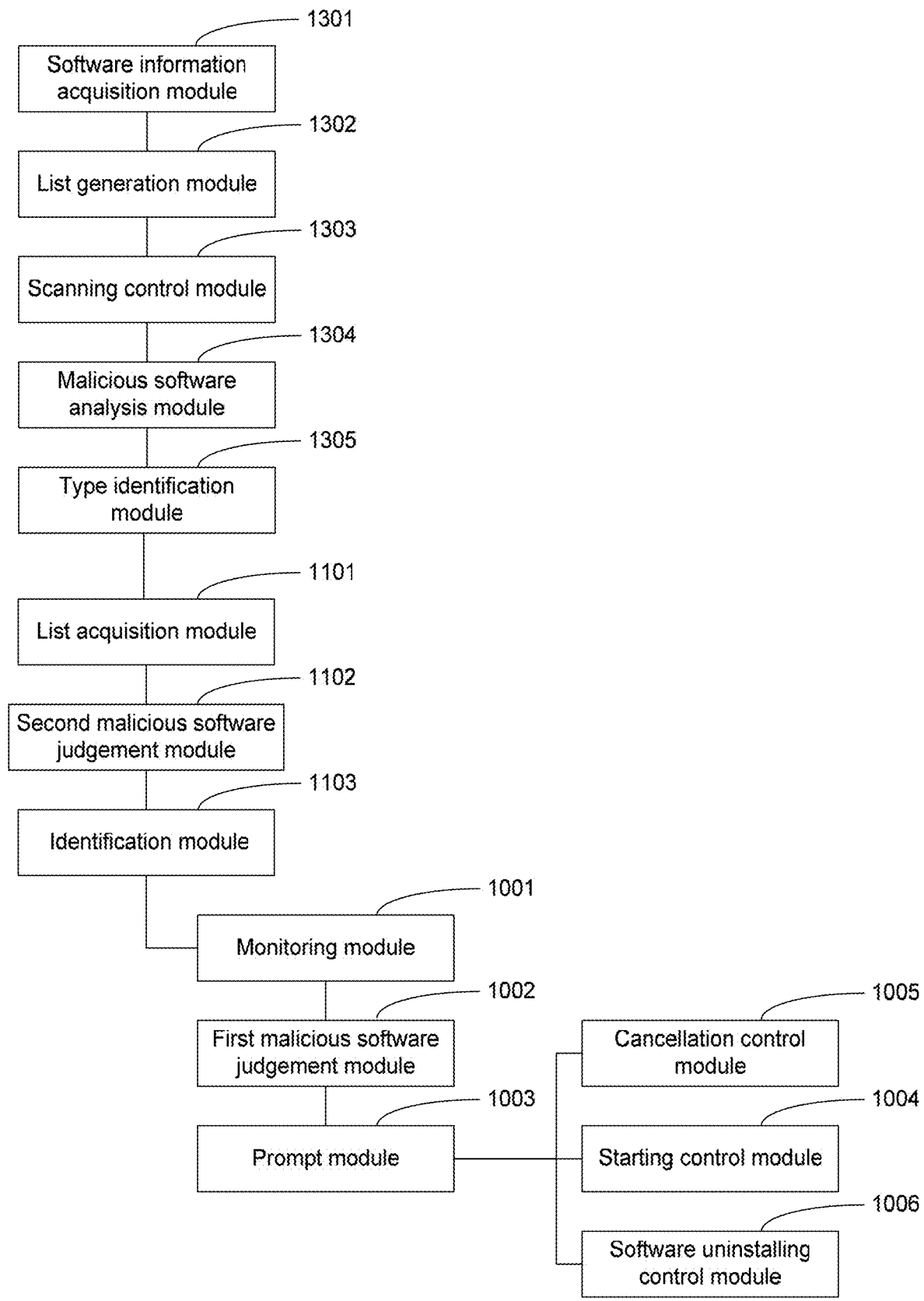
FIG. 13 is a structural diagram illustrating a terminal according to another specific example.
Figure 14:
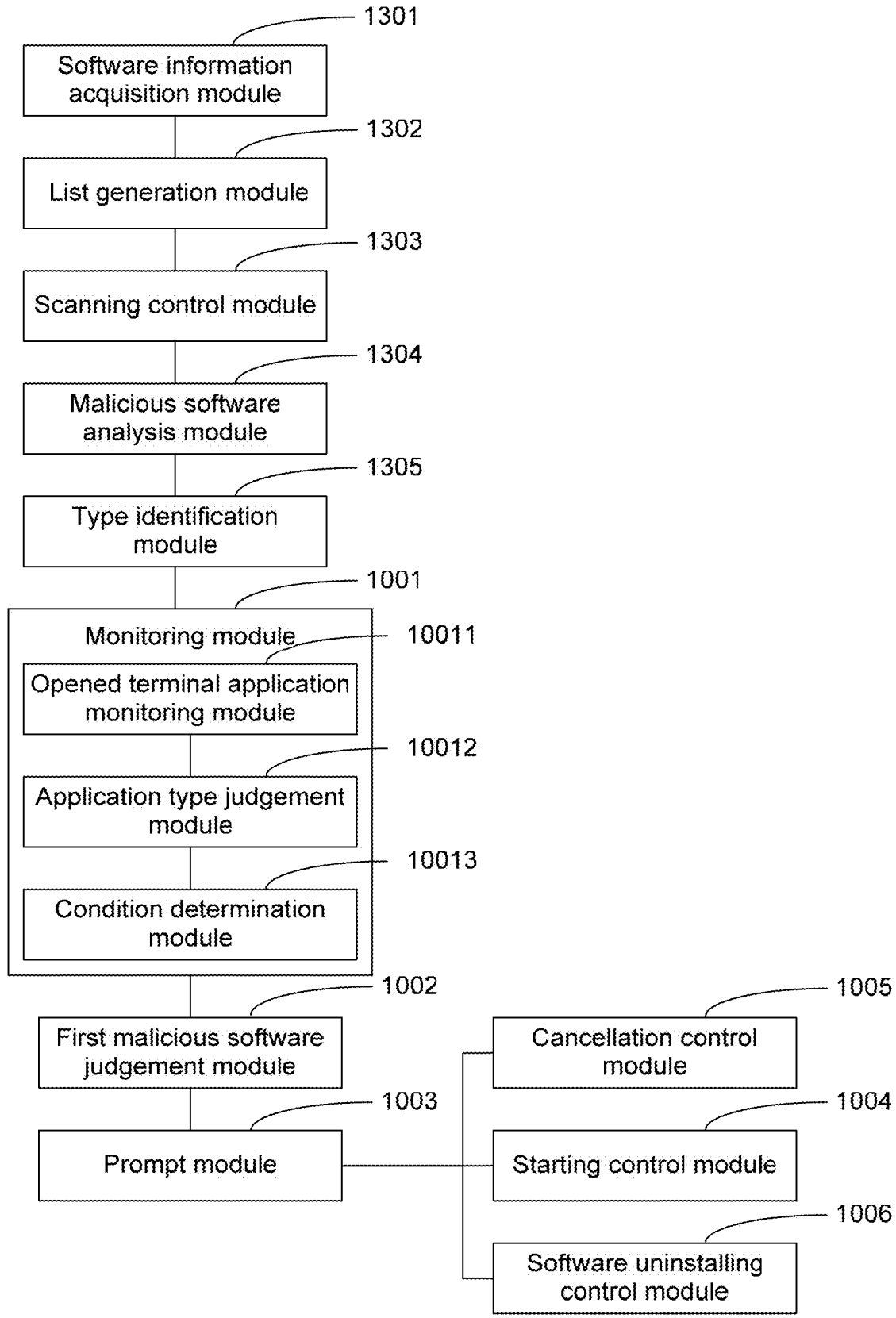
FIG. 14 is a structural diagram illustrating a terminal according to another specific example.

Referring to the terminals according to two other specific examples shown in FIG. 13 and FIG. 14, on the basis of the terminals corresponding to FIG. 10, FIG. 11 and FIG. 12, the terminal according to the embodiments of the disclosure may further include:

a software information acquisition module 1301, configured to acquire information about all of application software locally installed on the terminal; and a list generation module 1302, configured to screen information about application software in a predetermined application type from all of application software, and generate an application software list.

Herein, the process of screening, by the list generation module 1302, the application software in the predetermined application type from all of application software may be executed in the modes as follows.

One of the modes may be: comparing each of application software with a software database, locally installed on a smart terminal, in a predetermined application type, if a comparison indicates consistency, determining that the application software is the application software in the predetermined application type, and if the comparison indicates inconsistency, determining that the application software is not the application software in the predetermined application type.

Besides, the obtained information about each of application software may be transmitted to a cloud server, and the cloud server compares the information about each of application software with a cloud database, then screens the information about the application software in the predetermined application type on the basis of the comparison, and returns the screened information to the smart terminal.

If necessary, the list generation module 1302 may execute a local comparison mode on the smart terminal and a comparison mode on the cloud server at the same time. The list generation module 1302 generates the application software list in the predetermined application type on the basis of a local comparison result from the smart terminal and a comparison result from the cloud server. The application software list may include the information about the screened application software in the predetermined application type.

As shown in FIG. 13 and FIG. 14, the terminal according to the embodiments of the disclosure may further include:

a scanning control module 1303, configured to start scanning each of application software in the application software list, and obtain a scanning result about scanning each of application software in the application software list;

a malicious software analysis module 1304, configured to judge, according to the scanning result, whether corresponding application software is malicious software; and a type identification module 1305, configured to identify the malicious type of the malicious software determined by the malicious software analysis module 1304, and add information about the corresponding application software into a local malicious software library according to the malicious type.

Thus, when the first malicious software judgement module 1002 and the second malicious software judgement module 1102 judge whether current application software is malicious software, information about the current application software may be directly compared with the local malicious software library of the smart terminal. If a comparison result indicates inconsistency, it may be determined that the current application software is not malicious software. If the comparison result indicates consistency, it may be directly determined that the current application software is malicious software, and the malicious type of the malicious software may be determined to prompt the user of the smart terminal.

Those skilled in the art may understand that all or some flows in the methods according to the above-mentioned embodiments may be implemented by instructing related hardware via a computer program. The program may be stored in a non-volatile computer readable storage medium. For example, in the embodiments of the disclosure, the program may be stored in a storage medium of a computer system, and executed by at least one processor in the computer system, so as to implement the flows including the embodiments for each of the methods. Herein, the storage medium may be a magnetic disk, an optical disc, a Read-Only Memory (ROM), a Random Access Memory (RAM) and the like.

All technical features of the above-mentioned embodiments may be freely combined. For purpose of conciseness, not all possible combinations of all the technical features in the embodiments are described. However, as long as the combinations of these technical features do not conflict against each other, they shall be regarded as falling into the scope recorded in this description.

The above-mentioned embodiments only express several implementation modes of the disclosure, and the description is more specific and detailed, but cannot be accordingly interpreted as limits to the patent scope of the disclosure. It shall be noted that those skilled in the art may also make some variants and improvements without departing from the concept of the disclosure, all of them falling within the protection scope of the disclosure. Therefore, the protection scope of the disclosure shall accord with the appended claims.

The invention claimed is:

1. An application security protection method, comprising:
   obtaining, from a top of a stack installed locally on a terminal, information about a recently-opened application software, wherein the stack is configured to store information about opened applications;
   acquiring an application software list, installed locally on the terminal having a predetermined application type, wherein the predetermined application type indicates a category of function for applications in the application software list;
   determining whether the recently-opened application software is of the predetermined application type by comparing the obtained information about the recently-opened application software with an information library for the predetermined application type;
   in response to the determination that the recently-opened application software is of the predetermined application type, determining whether the recently-opened application software is malicious according to information in a local malicious software library;
   in response to the determination that the application software is malicious, marking an icon of the application software displayed on a display of the terminal with at least one of a corner mark, a different color, or a highlighting, to indicate that the application software is malicious;
   receiving an opening instruction fora current application software;
   determining whether an application software protection triggering condition is satisfied;
   in response to the determination that the application software protection triggering condition is satisfied, determining whether the current application software is marked as malicious;
   in response to the determination that the current application software is marked as malicious, providing prompt information indicating that the current application software is malicious;
   when an opening continuing instruction for continuing to open the current application software is received, starting the current application software; and
   wherein the method further comprises generating the local malicious software library by:
   starting scanning each application software in the application software list, and obtaining a scanning result about scanning each of the application software in the application software list,
   judging, according to the scanning result, whether corresponding application software is malicious, and
   when it is judged that the corresponding application software is malicious, identifying a malicious type of the corresponding application software from a plurality of malicious types, the malicious types comprising payment, privacy stealing, remote control, malicious propagation, charge consumption, system destruction, frauds, and rogueries, and adding information about the corresponding application software corresponding to the malicious type to the local malicious software library.

2. The application security protection method according to claim 1, further comprising after the prompt information is provided:
   stopping, when an opening cancellation instruction is received, start of the current application software.

3. The application security protection method according to claim 2, further comprising after start of the current application software is stopped:
   providing prompt information indicating whether to uninstall the current application software; and
   uninstalling, when a software uninstalling instruction is received, the current application software according to the software uninstalling instruction.

4. The application security protection method according to claim 2, wherein the prompt information is displayed with a pop-up box.

5. The application security protection method according to claim 4, wherein the pop-up box is provided with an opening control and a stopping control, the opening continuing instruction is received by means of the opening control, and the opening cancellation instruction is received by means of the stopping control.

6. The application security protection method according to claim 1, further comprising before the application software list is acquired:
   acquiring information about all of application software locally installed on the terminal; and
   screening information about the application software having the predetermined application type from all of application software, and
   generating the application software list.

7. A terminal, comprising a processor and a memory having stored thereon instructions, when executed by the processor, causing the processor to execute the steps of:
   obtaining, from a top of a stack installed locally on the terminal, information about a recently-opened application software, wherein the stack is configured to store information about opened applications;
   acquiring an application software list, installed locally on the terminal having a predetermined application type, wherein the predetermined application type indicates a category of function for applications in the application software list;
   determining whether the recently-opened application software is of the predetermined application type by comparing the obtained information about the recently-opened application software with an information library for the predetermined application type;
   in response to the determination that the recently-opened application software is of the predetermined application type, determining whether the recently-opened application software is malicious according to information in a local malicious software library;
   in response to the determination that the application software is malicious, marking an icon of the application software displayed on a display of the terminal with at least one of a corner mark, a different color, or a highlighting, to indicate that the application software is malicious;

receiving an opening instruction for a current application software;

determining whether an application software protection triggering condition is satisfied;

in response to the determination that the application software protection triggering condition is satisfied, determining whether current application software is marked as malicious;

in response to the determination that the current application software is marked as malicious, providing prompt information indicating that the current application software is malicious;

when an opening continuing instruction for continuing to open the current application software is received, starting the current application software;

starting scanning each application software in the application software list, and obtaining a scanning result about scanning each of the application software in the application software list;

judging, according to the scanning result, whether corresponding application software is malicious; and when it is judged that the corresponding application software is malicious, identifying a malicious type of the corresponding application software from a plurality of malicious types, the malicious types comprising payment, privacy stealing, remote control, malicious propagation, charge consumption, system destruction, frauds, and rogueries, and adding information about the corresponding application software corresponding to the malicious type to a local malicious software library.

8. The terminal according to claim 7, wherein the instructions, when executed by the processor, cause the processor to execute the step of:

stopping, when an opening cancellation instruction is received, start of the current application software.

9. The terminal according to claim 8, wherein the instructions, when executed by the processor, cause the processor to execute the steps of:

providing, after start of the current application software is stopped, prompt information indicating whether to uninstall the current application software; and uninstalling, when a software uninstalling instruction is received, the current application software according to the software uninstalling instruction.

10. The terminal according to claim 8, wherein the step, executed by the processor, of providing the prompt information indicating that the current application software is malicious comprises:

displaying the prompt information with a pop-up box, wherein the pop-up box is provided with an opening control and a stopping control, when the processor executes the instructions, the opening continuing instruction is received by means of the opening control, and the opening cancellation instruction is received by means of the stopping control.

11. The terminal according to claim 7, wherein the instructions, when executed by the processor, cause the processor to execute the steps of:

acquiring information about all of application software locally installed on the terminal; and screening information about the application software having the predetermined application type from all of application software, and generating the application software list.

12. A non-volatile storage non-transitory computer readable medium comprising a computer readable program, wherein when the computer readable program in the non-transitory computer readable medium storage medium is executed, an application security protection method is executed, the method comprising:

obtaining, from a top of a stack installed locally on a terminal, information about a recently-opened application software, wherein the stack is configured to store information about opened applications;

acquiring an application software list, installed locally on the terminal having a predetermined application type, wherein the predetermined application type indicates a category of function for applications in the application software list;

determining whether the recently-opened application software is of the predetermined application type by comparing the obtained information about the recently-opened application software with an information library for the predetermined application type;

in response to the determination that the recently-opened application software is of the predetermined application type, determining whether the recently-opened application software is malicious according to information in a local malicious software library;

in response to the determination that the application software is malicious, marking an icon of the application software displayed on a display of the terminal with at least one of a corner mark, a different color, or a highlighting, to indicate that application software is malicious, and receiving an opening instruction for current application software;

determining whether an application software protection triggering condition is satisfied;

in response to the determination that the application software protection triggering condition is satisfied, determining whether the current application software is marked as malicious;

in response to the determination that the current application software is marked as malicious, providing prompt information indicating that the current application software is malicious;

when an opening continuing instruction for continuing to open the current application software is received, starting the current application software;

starting scanning each application software in the application software list, and obtaining a scanning result about scanning each of the application software in the application software list;

judging, according to the scanning result, whether corresponding application software is malicious; and when it is judged that the corresponding application software is malicious, identifying a malicious type of the corresponding application software from a plurality of malicious types, the malicious types comprising payment, privacy stealing, remote control, malicious propagation, charge consumption, system destruction, frauds, and rogueries, and adding information about the corresponding application software corresponding to the malicious type to a local malicious software library.

* * * * *